(12) United States Patent
Sauer

(10) Patent No.: US 6,320,276 B1
(45) Date of Patent: Nov. 20, 2001

(54) WINDOW WITH AN AERIAL FOR MOTOR VEHICLES

(75) Inventor: Gerd Sauer, Stolberg (DE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/356,411

(22) Filed: Jul. 16, 1999

(30) Foreign Application Priority Data

Jul. 17, 1998 (DE) .............................................. 198 32 228

(51) Int. Cl.⁷ ...................................................... B60L 1/00
(52) U.S. Cl. .......................... 307/10.1; 307/9.1; 343/704; 343/711
(58) Field of Search ..................................... 307/10.1, 9.1; 343/702, 714, 715, 718, 892, 704, 711, 712, 713

(56) References Cited

U.S. PATENT DOCUMENTS 5,005,020   4/1991   Ogawa et al. ........................ 343/713
5,285,048 * 2/1994   Nakase ................................. 219/203

FOREIGN PATENT DOCUMENTS

| 19513263 A1 | 10/1996 | (DE) . |
| 19532431 A1 | 3/1997 | (DE) . |
| 19735395 | 2/1998 | (DE) . |
| 0561272 A1 | 9/1993 | (EP) . |
| 0645240 A1 | 3/1995 | (EP) . |
| 0720249 A2 | 7/1996 | (EP) . |
| 62131606 | 6/1987 | (JP) . |

* cited by examiner

Primary Examiner—Josie Ballato
Assistant Examiner—Robert L. DeBeradinis
(74) Attorney, Agent, or Firm—Pennie & Edmonds LLP

(57) ABSTRACT

A window with an aerial for motor vehicles is provided with an electrically conductive layer (5) which fulfils the function of an aerial conductor. In order to prevent capacitive coupling of the layer to the bodywork of the vehicle, the layer (5) ends at a distance of a few centimetres from the edge of the window. The layer (5) is coupled capacitively to the aerial connection cable leading to the receiver set by means of a coupling electrode (9). The coupling electrode comprises thin wires (10) which are connected together by electroplating and are arranged at a large distance from one another which is large compared with their diameter.

9 Claims, 2 Drawing Sheets

WINDOW WITH AN AERIAL FOR MOTOR VEHICLES

BACKGROUND OF THE INVENTION

The present invention relates to a window with an aerial for motor vehicles, comprising an electrically conductive coating used as an aerial conductor and a connection element which is coupled capacitively to the electrically conductive coating by means of a coupling electrode with interposition of an insulating layer.

Windows with an aerial comprising transparent coatings which can conduct electricity are known in various embodiments. The coatings are generally coatings that reflect infrared radiation, which above all have a sun protection function. These coatings which reflect infrared radiation mostly have one or more functional layers of silver and have a surface resistance of about 4 Ω/□ for an optical transmission of 75%. By virtue of their electrical conduction property, these layers can be used as a reception aerial for radio reception.

The conductive layers, which essentially consist of multiple layers applied by sputtering, generally lie inside a laminated glass window. They may be arranged directly on the surface of one of the two panes or on the surface of a thin transparent support sheet which is connected to the two panes by means of two thermoplastic adhesive sheets.

Document DE 19 735 395 A1 describes how to capacitively couple a conductive layer used as an aerial to the connection conductor via which the aerial signal is transmitted to the radio receiver. The capacitive coupling is then carried out in such a way that an electrode produced in the form of a strip is pressed onto that face of the laminated glass window which faces the passenger compartment, whereas the conductive layer is arranged inside the laminated glass window. The length of the electrode in the form of a strip must be more than 5 cm and its width must lie between 5 and 10 mm. The coupling electrode must be installed at as large as possible a distance from the conducting window frame, that is to say inside the visible surface of the window. If it is desired to avoid the effect which is detrimental in optical terms which results therefrom, the decorative frame of opaque enamel generally applied to the edge of the window must be produced in a corresponding width. The area of the window is thus further reduced, and the widened decorative frame also involves a reduction in the apparent image of the window of the vehicle.

SUMMARY OF THE INVENTION

The object of the invention is, while keeping the capacitive coupling, which is advantageous per se, between the aerial connection conductor and the conductive layer, to produce the coupling electrode in such a way that it can be installed in the window region not covered by the decorative frame, that is to say in the region intended for looking through, without it producing an effect which is detrimental at the optical level.

This object is achieved according to the invention by the fact that the coupling electrode consists of thin wires which are connected together by electroplating and are arranged at a distance from one another which is large compared with their diameter.

When wires with, for example, a diameter of 10 to 100 $\mu$m are arranged inside a laminated glass window, or on its surface, they are absolutely imperceptible as such under normal conditions, unless they are arranged at very short distances from one another. On the other hand, when the spacing between them amounts to at least about 10 times their diameter, they can only be seen as such by putting one's eyes very close to the window. The invention exploits this phenomenon. It has astoundingly been found that, in comparison with a plane coupling electrode fabricated, for example, from a strip of metal sheet, the coupling capacity achieved in the embodiment according to the invention is amply sufficient for transmitting the aerial signal. Comparing, for example, the coupling capacity of a coupling electrode composed of three tungsten wires each with a length of 5 cm and a diameter of 20 $\mu$m, which are arranged parallel at a distance of 3 mm from one another, on the one hand, and a copper electrode with the same length and a width of 6 mm, measurements show that the coupling capacity is no less than 40%. By increasing the number of wires and their length, the coupling capacity can if necessary be increased to the same value as that of known coupling electrodes which have a continuous surface.

BRIEF DESCRIPTION OF THE DRAWINGS

Embodiment aspects and advantageous developments of the invention will emerge from the dependant claims and the following description of embodiment examples which is given with reference to the drawings, in which:

DETAILED DESCRIPTION OF THE DRAWINGS

In principle, the invention can find an application not only in laminated glass windows, but also in monolithic windows for vehicles, in which windows the conductive layer is deposited on the surface facing the passenger compartment and is composed, in particular, of fluorine-doped tin oxide applied by pyrolysis. In this case, the wires forming the coupling electrode are embedded between dielectric sheets made of a transparent polymer. The sheet facing the conductive layer preferably consists of an adhesive material or is provided with an adhesive layer, with the aid of which the coupling electrode adheres to the window.

The invention is, however, principally intended for laminated glass windows. It is consequently described here on the basis of embodiment examples provided for laminated glass windows. While windscreens for road vehicles almost exclusively consist of laminated glass, laminated glass is also used to an increasing extent for rear windows, so that the windows with an aerial according to the invention are not in principle limited to windscreens, but may naturally be used for all vehicle windows.

Figure 1:
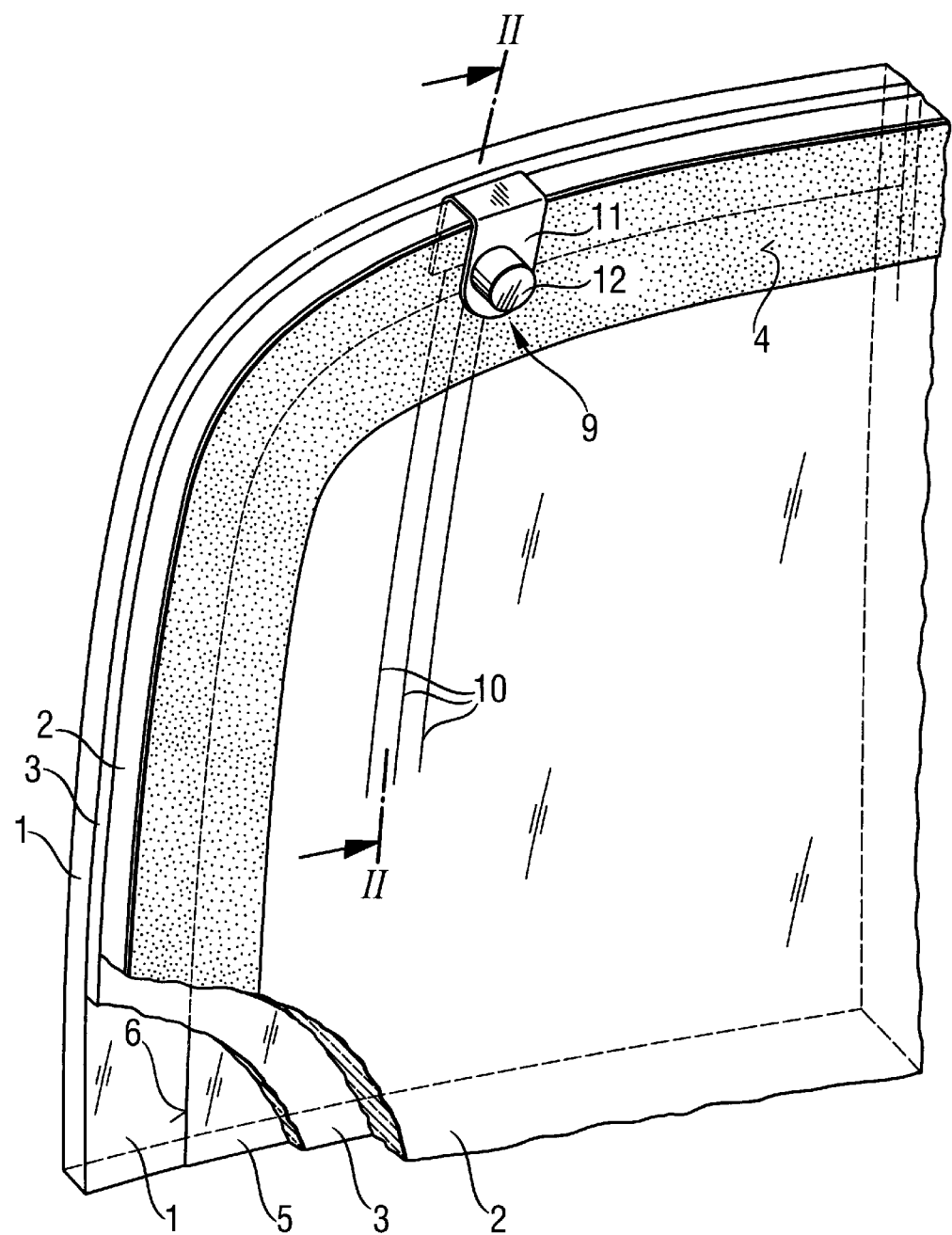
FIG. 1 is a cutaway view of a windscreen according to the invention in the connection region of the aerial.

As shown by FIG. 1, a laminated glass windscreen is composed, in its simplest embodiment, of two panes 1 and 2, which are connected by a thermoplastic intermediate layer 3, in general made of polyvinyl butyral.

The inner pane 2 is provided on its face turned towards the driving compartment with a decorative frame 4 made of an opaque enamel. The outer pane 1 is provided with an electrically conductive layer 5 on the side adjacent to the thermoplastic intermediate layer 3. This layer 5 is preferably a multiple layer, which is essentially composed of metal oxide, metal and metal oxide, which are deposited on the surface of the pane by the process of magnetic field-assisted cathodic sputtering. The region of the edge of the window is free of the conductive layer over a width B of about 2 to 4 cm, in order to prevent capacitive coupling of the layer with the fastening area on the bodywork of the vehicle, which would substantially impair the efficiency of the conductive layer 5 as an aerial. The decorative frame 4 extends beyond the boundary 6 of the layer 5, so that the end of the layer is not perceived as such with the naked eye. In order for the edge of the pane 1 to remain free of the layer 5, the edge of the pane may be masked before depositing the layer, or the layer may be removed subsequently in the region of the edge.

For the purpose of capacitively coupling the layer 5 to the radio receiver, the coupling electrode 9 is fixed on the edge of the pane 2 before the laminated glass window is manufactured, that is to say before assembling the layers forming the laminated glass window. The coupling electrode proper consists of a plurality of thin metal wires 10, for example three tungsten wires with a diameter of 20 $\mu$m, which extend at a distance of about 2 to 5 mm parallel to one another. The tungsten wires are preferably blackened on the surface and are virtually invisible to the naked eye. The wires 10 are electrically connected to one end of a strip of metal sheet 11. The strip of metal sheet 11 is arranged around the surface of the perimeter of the pane 2 and is adhesively bonded to the surface of the glass. It is provided at its end with a connection bar or a contact element 12 which is used for connection to the aerial cable joining the radio receiver. The wires 10 and the strip of metal sheet 11 are adhesively bonded to the pane 2 by means of a suitable adhesive layer.

The coupling electrode 9, consisting of the wires 10 and the strip of metal sheet 11 which is connected to them, is produced, for example, in the form of a prefabricated component according to the process described in document DE 4 332 320 C 1, in which the wires are deposited and fixed on an intermediate support sheet with the desired geometrical layout. In order to fix the wires on the intermediate support sheet, use may for example be made of a thermoplastic adhesive layer, in particular of the same thermoplastic material as the thermoplastic sheet 3 of the laminated glass window.

The coupling electrode is applied and fixed on the pane 2 by means of the intermediate support sheet. After removal of the intermediate support sheet, the panes 1 and 2 and the intermediate thermoplastic plastic layer 3 are treated in a conventional way by using heat and pressure in order to form the laminated glass window.

Figures 2, 3:
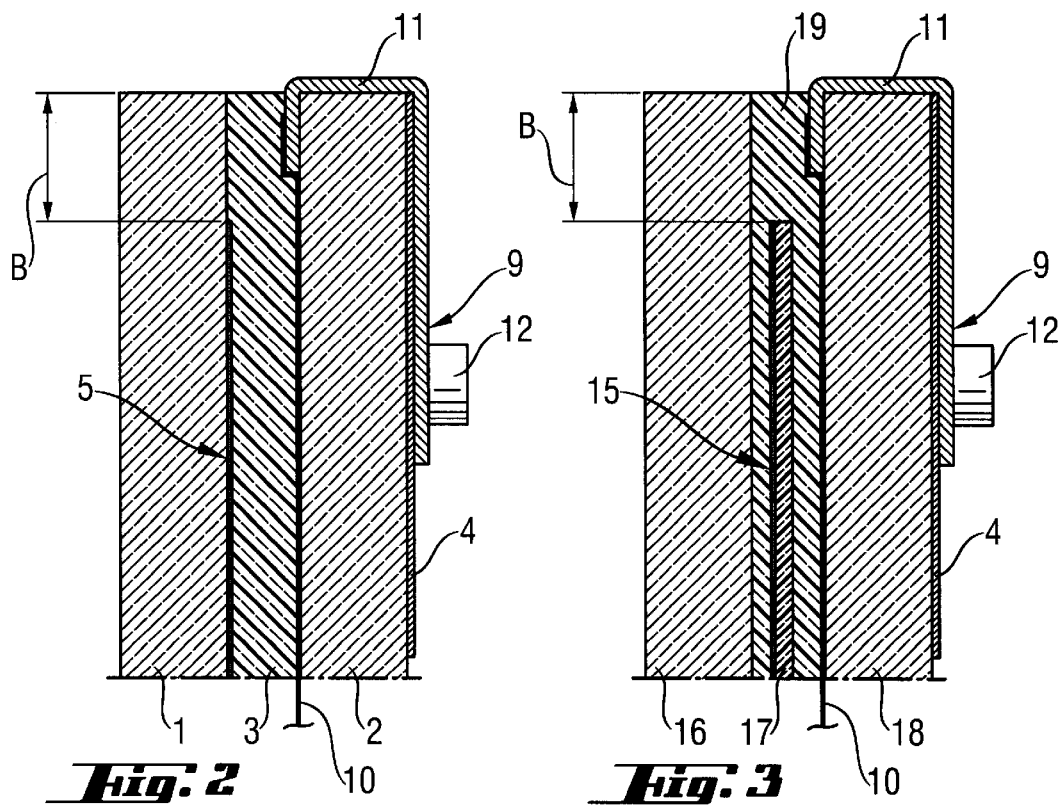
FIG. 2 is a view in section taken on the line II—II of FIG. 1 in the region of the upper edge of the windscreen.
FIG. 3 is a sectional view in the region of the upper edge of another embodiment of a windscreen according to the invention.

FIG. 3 shows another embodiment of a window with an aerial according to the invention. In this case, the electrically conductive layer 15 is not located on the outer pane 16, but on a thin transparent sheet 17, for example of polyethylene terephthalate (PET). The coated sheet 17 is in total smaller than the panes 16, 18, so that the region of the edge of the laminated glass window is again free of the layer in order to avoid marginal capacitive coupling to the metal bodywork of the vehicle. The coated sheet 17 is inserted between two polyvinyl butyral sheets which become bonded to the coated sheet during the process of assembling the laminated glass, and merge into one another in the region of the edge to form a homogeneous intermediate layer 19.

The capacitive coupling of the conductive layer 15 to the aerial cable leading to the radio receiver is carried out by means of the coupling electrode consisting of the wires 10 and the strip of metal sheet 11, in the same way as described in regard to FIGS. 1 and 2, so that reference should be made thereto in this regard.

Figure 4:
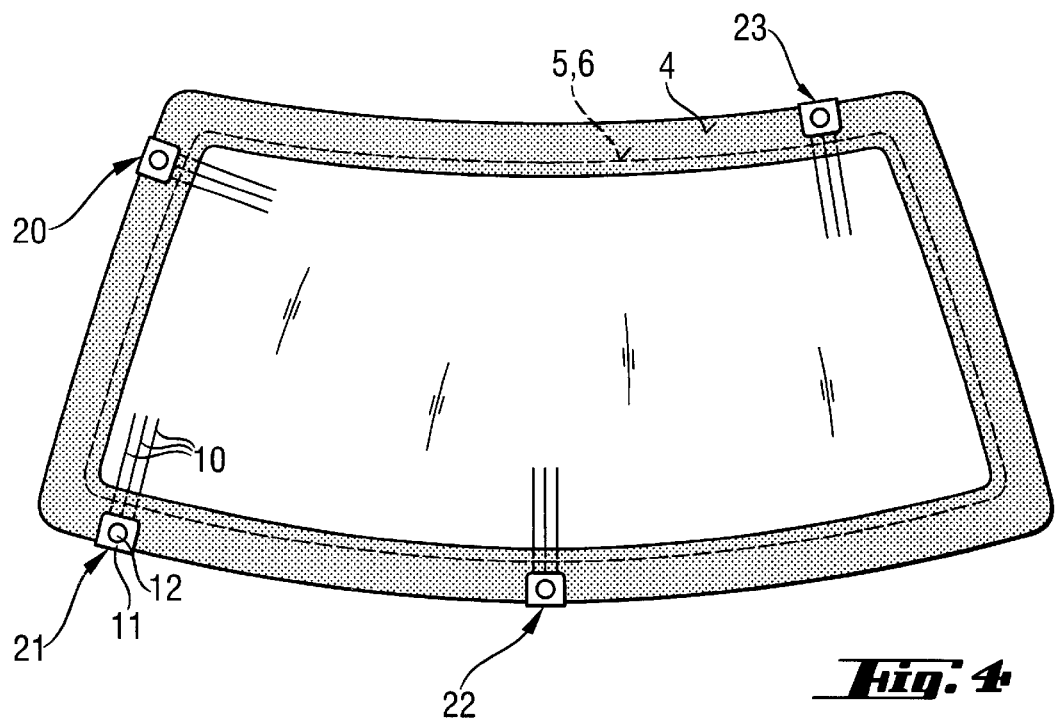
FIG. 4 shows a windscreen comprising a plurality of coupling sites for use as a diversity antenna.

FIG. 4 shows a front view of a windscreen with an aerial suitable for being used as a diversity antenna comprising a total of four coupling electrodes 20 to 23. It is known that, in layered aerials, the amplitude of the aerial signal and its radio reception characteristic depend on the position of the coupling point and the respective orientation of the window with an aerial with respect to the transmitter, so that the performance of the aerial can be optimized by installing a plurality of coupling electrodes at different points on the layer and by selecting the most favourable coupling point in each case, with the aid of a diversity processor. In the example illustrated, the windscreen is provided with a total of four coupling electrodes, namely one coupling electrode 20 in the upper left-hand corner region, one coupling electrode 21 in the lower left-hand corner region, another coupling electrode 22 in the middle of the lower edge region and one coupling electrode 23 in the upper right-hand corner region.

The length of the thin wires forming the coupling electrode dictates the capacitance of the coupling capacitor and may be chosen with a view to as low a loss as possible; it must be at least about 5 cm, and preferably between 10 and 30 cm. Similarly, the number of wires affects the coupling capacity; the usable aerial signal power can thus also be enhanced by increasing the number of wires.

The embodiment examples which have been described refer to laminated glass windows in which the electrically conductive layer lies on an inner face of the laminated glass window. However, as already mentioned above, it is of course also possible, according to the invention, to produce capacitive coupling of the aerial cable to an electrically conductive layer on an external surface of a laminated glass window or on a monolithic window, for example an indium tin oxide layer applied by pyrolysis to the windscreen surface facing the passenger compartment. In this case, it will be necessary to choose an embodiment of the coupling electrodes in which the coupling wires are coated with an insulating layer or embedded between insulating layers.

What is claimed is:

1. In a window with an aerial for motor vehicles, having an electrically conductive coating used as an aerial conductor and a connection element which is coupled capacitively to the electrically conductive coating by means of a coupling electrode the improvement wherein the coupling electrode (9) comprises thin wires (10) connected together at one end and arranged along their length at a distance from one another which is large compared with their diameter.

2. Window with an aerial according to claim 1, wherein the coupling electrode (9) comprises wires with a thickness of 10 to 100 $\mu$m.

3. Window with an aerial according to claim 2, wherein the coupling electrode (9) comprises two to ten wires arranged along their length at a distance of 1 to 5 mm parallel to one another and connected together at said one end, said one end being located adjacent said connection element.

4. Window with an aerial according to claim 3, wherein the wires (10) of the coupling electrode (9) have a length of at least 5 cm.

5. Window with an aerial according to claim 4, wherein the wires (10) have a length of between 10 and 30 cm.

6. Window with an aerial according to any one of claims 1 to 4, wherein the coupling electrode (9) is a prefabricated component comprising the wires (10), a strip of metal sheet

(11) connected to said one end of the wires (10) by electroplating and a contact element (12).

7. Window with an aerial according to claim 6, wherein the coupling electrode (9) is provided with an adhesive layer in the region of said wires for fastening said electrode by adhesion on the window.

8. Window with an aerial according to claim 7, wherein the window is made of laminated glass panes (1, 2) separated by an intermediate thermoplastic layer (3), and said adhesive layer in said region of the wires (10) is composed of the same thermoplastic polymer as the intermediate thermoplastic layer (3) between the laminated glass panes.

9. Window with an aerial according to any one of claims 1 to 4, wherein said window is provided with a plurality of spaced coupling electrodes (20, 21, 22, 23) around the periphery of the window.

* * * * *